April 9, 1929.  M. L. RILEY  1,708,327
DOWN CORN CONVEYER FOR CORN HARVESTERS
Filed Oct. 12, 1923   2 Sheets-Sheet 1
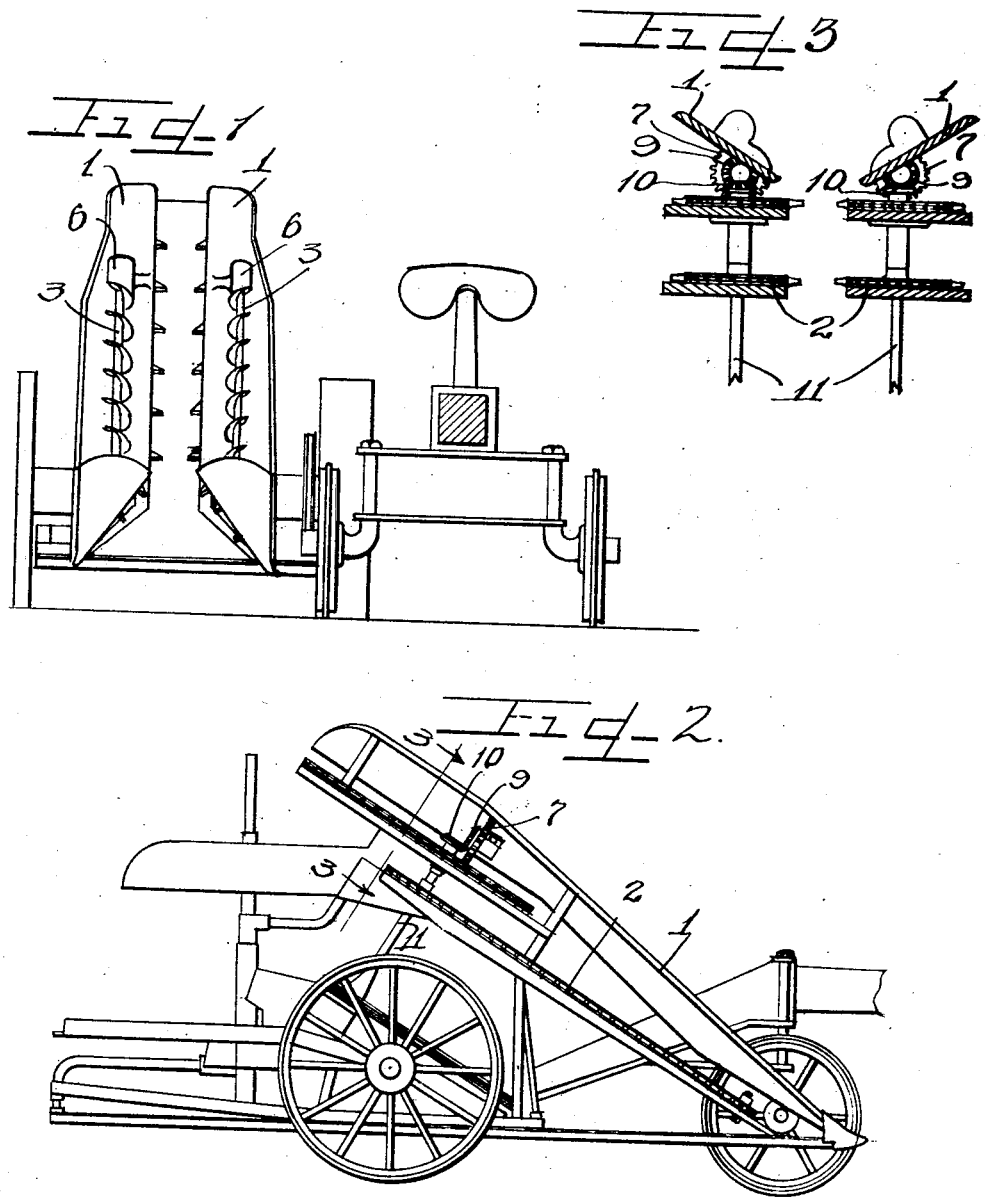

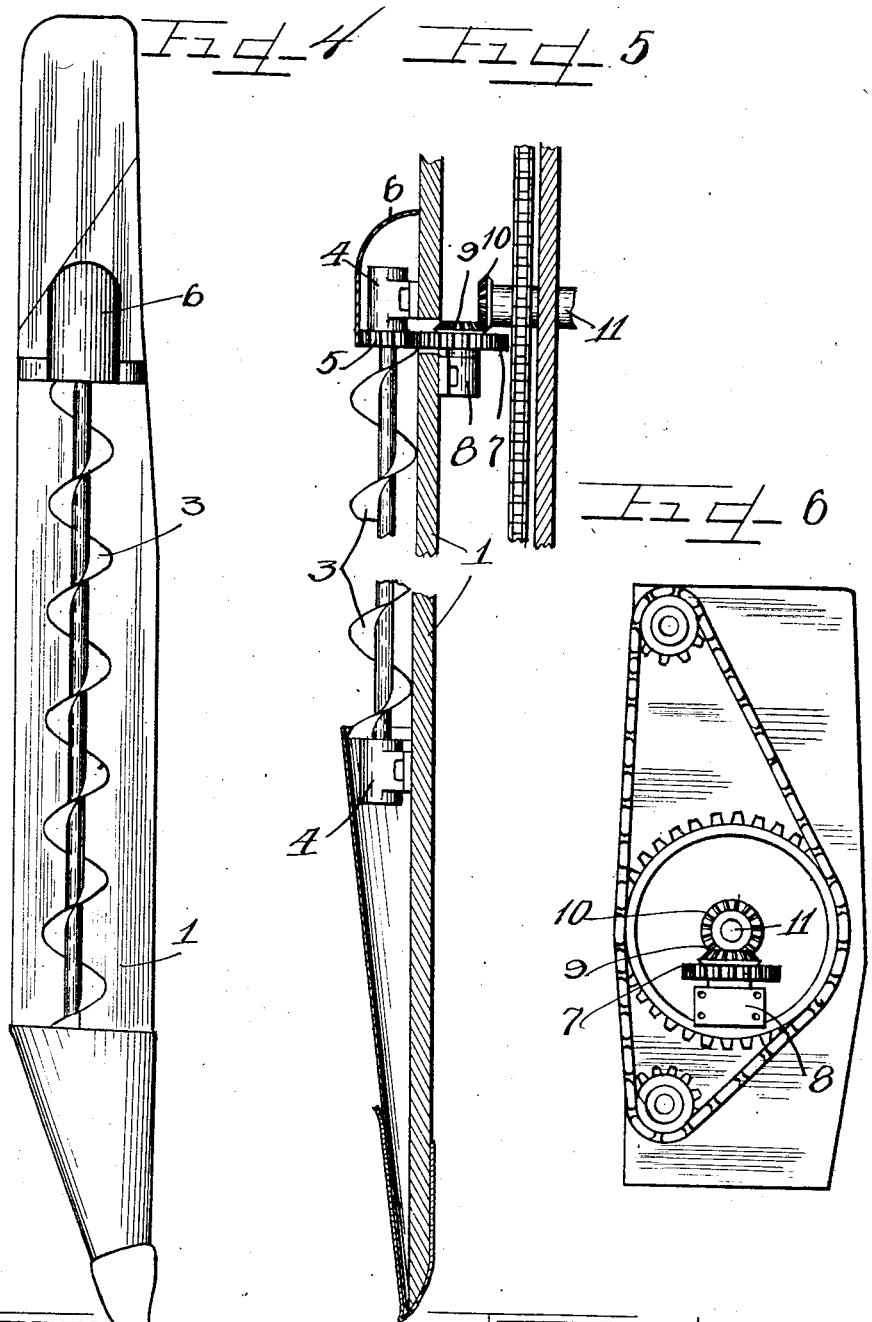

Patented Apr. 9, 1929.

1,708,327

UNITED STATES PATENT OFFICE.

MARK L. RILEY, OF BARRINGTON, ILLINOIS.

DOWN-CORN CONVEYER FOR CORN HARVESTERS.

Application filed October 12, 1923. Serial No. 668,163.

This invention relates to an improvement in corn harvesters and mechanisms which may be applied to existing harvesters or incorporated in newly manufactured harvesters.

As now constructed, these corn harvesters have elevator chains which control the stalks and assist the gathering boards in elevating and straightening the fallen stalks. These gathering boards extend upwardly at an incline from a point near the ground. As the fallen corn is elevated, it usually flops upon or over these boards so an increased effort or power is required to elevate the same and pull the harvester. As now constructed, it requires three horses to draw a harvester.

This invention is designed to overcome this defect in the provision of means upon the gathering boards for elevating and straightening the corn without materially impeding the progress of the harvester, and whereby a pair of horses will suffice for drawing the harvester under most normal conditions.

The invention comprises the novel structure and combinations hereinafter described and more particularly pointed out and defined in the appended claim.

In the accompanying drawings which illustrate a preferred embodiment of this invention and in which similar reference numerals refer to similar features in the different views.

Fig. 1 is a front elevational view of a well known corn harvester having my invention applied thereto.

Fig. 2 is a side elevational view of the corn harvester embodying this invention.

Fig. 3 is a sectional view of certain mechanisms upon the line 3—3 of Fig. 2.

Fig. 4 is an enlarged plan view of a gathering board embodying this invention.

Fig. 5 is an enlarged sectional view through one of the gathering boards showing certain operating mechanisms.

Fig. 6 is an enlarged plan view of the operating mechanism for the upper elevator chains.

In the drawing there is shown certain parts of a well known corn harvester. It has not been deemed necessary to illustrate the machine in detail, as the structure and operation of the machine is well known. Only those parts have been illustrated which co-operate with this invention, and only such parts need be described.

In referring to the drawing it will be observed that the machine embodies a pair of gathering boards which extend upwardly in inclined parallel and spaced relation from a point near the ground. These boards converge toward each other as shown in Fig. 3, and the lower ends of these boards have diverging or outwardly inclined noses in the form of shrouds that have the function of passing beneath fallen stalks and elevating and raising the same. The stalks then pass between the gathering boards as the harvester advances, and the elevating chains 2 engage the fallen stalks and assist in elevating and straightening the same. In the past the fallen stalks would flop over and upon these gathering boards making it much harder to pull the machine, and much harder for the chains 2 to function.

This invention consists of means upon the gathering board for elevating and straightening the fallen stalks so as to relieve the pressure and load upon said gathering board. Consequently less power is required to draw the harvester and operate the elevating chains 2. While this means may consist of any rolling or other elements, in the present instance, I have elected to illustrate rotating elements in the form of spiral rollers or conveyers 3. These spiral conveyers are rotatably mounted in suitable bearing lugs 4 secured upon the gathering boards, and extend lengthwise thereof. The lower ends of the spiral conveyers preferably extend adjacent or beneath the shrouds or noses, so that the stalks may be engaged thereby as soon as they pass beyond the said noses.

A spur gear 5 (Fig. 5) is secured upon the upper end of each spiral conveyer adjacent the bearing lug 4, and a shroud or sheath 6 extends over the lug and gear to protect the same and keep the stalks from becoming entangled with the gear. These spur gears 5 are in mesh with spur gears 7 which are axially supported in bearing lugs 8 secured to the bottom of the gathering boards which are suitably slotted to allow the gears 7 to extend therethrough. Bevel pinions 9 are secured coaxially of the spur gears 7 for conjoint rotation therewith and these bevel pinions are in mesh with bevel pinions 10 secured upon the inclined vertical driving shafts 11. These shafts 11 are connected to the main drive of the harvester and are provided with gears for operating the different elevating chains, as is well known. For the purposes of explaining this invention, it will be understood that the shafts 11 in connection with the aforedescribed gearing constitutes means for rotating the spiral conveyers 3.

During the operation of the machine, the shafts 11 will be rotated for imparting rotary movement to the spiral conveyers through the gears 10, 9, 7 and 5, and as the fallen stalks are picked up by the noses on the gathering boards and pass therebeyond through the advancing movements of the harvester, they will come in contact with the spiral conveyers and be elevated and straightened. These rotating conveyers will relieve the drag and pressure of the fallen stalks upon the gathering boards, and guide and elevate the same without clogging so that much less power is required to draw or operate the machine. Further, clogging and entanglement of the stalks are eliminated, and the tendency to strip the ears greatly reduced.

I am aware that numerous details of construction may be varied through a wide range without departing from the principles of this invention, and I therefore do not purpose limiting the patent granted otherwise than necessitated by the prior art.

I claim as my invention:

In a corn harvester, a pair of spaced laterally, outwardly and upwardly inclined gathering boards, elevating chains positioned beneath said boards, and parallel spiral conveyers rotatably mounted on said boards and adapted for simultaneous cooperation with said chains to elevate the corn.

In testimony whereof I have hereunto subscribed my name.

MARK L. RILEY.